US005477422A

United States Patent [19]
Hooker et al.

[11] Patent Number: 5,477,422
[45] Date of Patent: Dec. 19, 1995

[54] ILLUMINATED LCD APPARATUS

[75] Inventors: Guy Hooker; Dave Smith, both of Camberley, England

[73] Assignee: Nokia Mobile Phones Limited, Salo, Finland

[21] Appl. No.: 330,099

[22] Filed: Oct. 27, 1994

Related U.S. Application Data

[63] Continuation of Ser. No. 62,933, May 17, 1993, abandoned.

[30] Foreign Application Priority Data

May 22, 1992 [GB] United Kingdom .................... 9211006

[51] Int. Cl.$^6$ ...................................................... F21V 8/00
[52] U.S. Cl. ............................. 362/29; 362/27; 362/242; 362/248; 359/49
[58] Field of Search ................................ 362/26, 27, 29, 362/30, 31, 290, 330, 237, 240, 242, 248; 359/48, 49, 50

[56] References Cited

U.S. PATENT DOCUMENTS

| 4,206,501 | 6/1980 | Brooks | 362/293 |
|---|---|---|---|
| 4,267,489 | 5/1981 | Morohashi | 40/361 |
| 4,502,761 | 3/1985 | Knoll et al. | 359/49 |
| 4,673,254 | 6/1987 | Kato et al. | 359/49 |
| 4,729,068 | 3/1988 | Ohe | 362/31 |
| 4,803,399 | 2/1989 | Ogawa et al. | 313/493 |
| 4,975,808 | 12/1990 | Bond et al. | 362/31 |
| 4,998,804 | 3/1991 | Horiuchi | 350/334 |
| 5,057,974 | 10/1991 | Mizobe | 362/26 |

FOREIGN PATENT DOCUMENTS

| 0212415A1 | 3/1987 | European Pat. Off. . |
|---|---|---|
| 0462361A1 | 12/1991 | European Pat. Off. . |
| 0503071 | 9/1992 | European Pat. Off. . |
| 2723483 | 11/1977 | Germany . |
| 2136186A | 9/1984 | United Kingdom . |
| 2196100 | 4/1988 | United Kingdom . |
| WO92/04400 | 3/1992 | WIPO . |

OTHER PUBLICATIONS

Patent Abstracts of Japan, vol. 15, No. 119 (P-1183) & JP03-009306, Mar. 22, 1991, 1 page.
Patent Abstracts of Japan, vol. 13, No. 146 (P854) (3494) & JP63 309,918, Dec. 19, 1988, 1 page.

*Primary Examiner*—Ira S. Lazarus
*Assistant Examiner*—Alan B. Cariaso
*Attorney, Agent, or Firm*—Perman & Green

[57] ABSTRACT

A back-lit LCD apparatus comprises a LCD (1), one or more LEDs (3) (or other light sources), and a plate-like light guide (2) behind the LCD (1). An attenuating member (5) is included in front or behind the light guide (5). In the former case the attenuating member (5) is formed as a sheet of reflective material on which is printed a pattern of non-reflective dots for reducing the intensity of light reaching portions of the LCD nearest to the light source. In the latter case the attenuating member (5) is transparent and the dots are either opaque or reflective. The size and frequency of the dots may be varied to adjust the level of attenuation. Also, the pattern of dots may be graduated to provide progressively less attenuation as the distance from the LEDs increases.

8 Claims, 2 Drawing Sheets

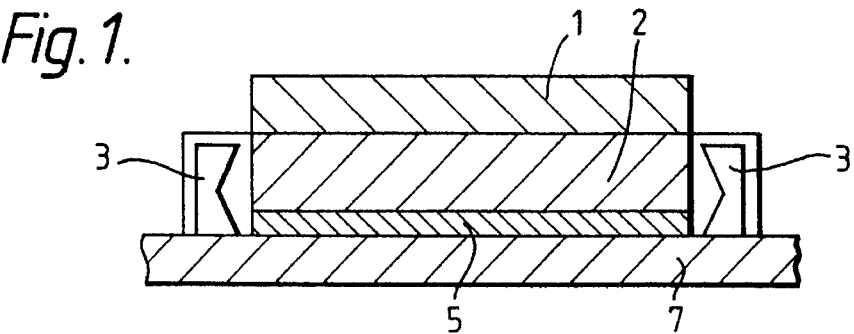
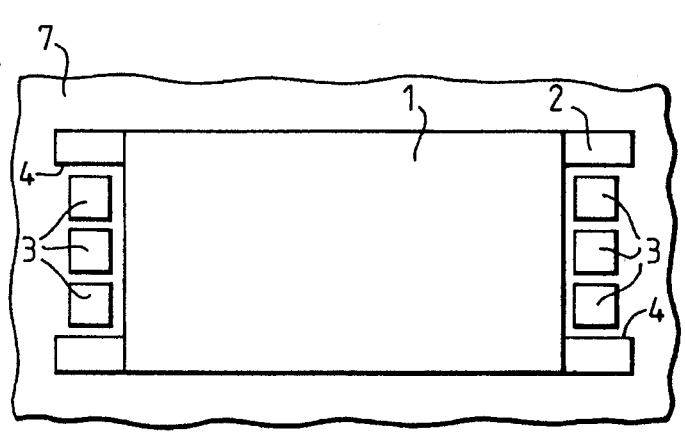
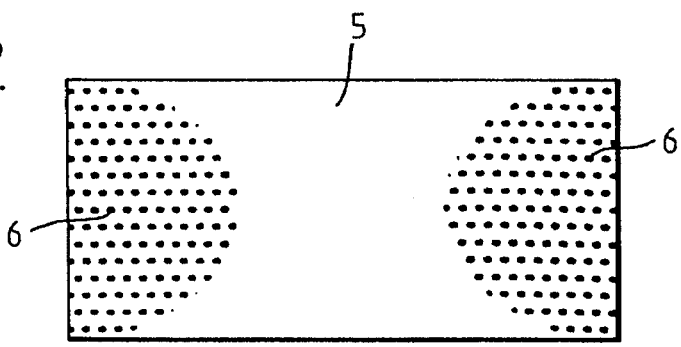
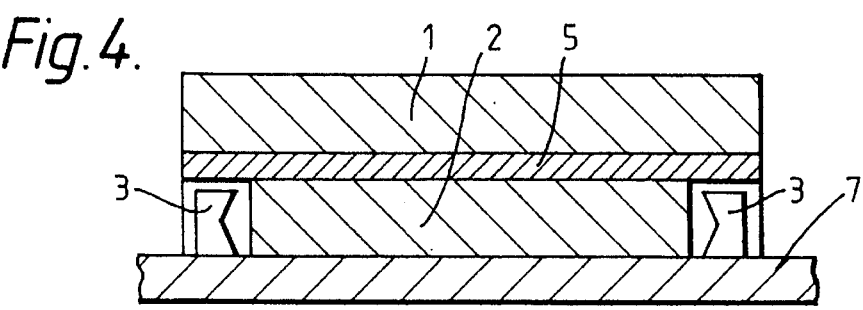

ILLUMINATED LCD APPARATUS

This is a continuation of application Ser. No. 08/062,933 filed on May 17, 1993, abandoned.

This invention relates to an illuminated liquid crystal display apparatus and specifically to a liquid crystal display (LCD) which is illuminated from behind.

BACKGROUND OF THE INVENTION

It is common practice to use a light guide (or so-called "light pipe") behind an LCD to distribute light from one or more light sources, such as light emitting diodes (LED's). The light guide is generally in the form of a plate-like member. Particularly in the case of a low-profile assembly, the LEDs are provided, for example, in a recess, at the side faces of the light guide. Light enters the light guide through the side faces and is distributed through the light guide by internal reflection. The front face of the light guide may be "roughened" to make it lossy so that light escapes into the LCD. The light guide thus acts to distribute light over a wide area of the LCD.

However, when relatively few light sources are used, there is a tendency for the illumination to be uneven over the whole area of the LCD. Generally the light is more intense nearer to the LED's and less intense further away.

U.S. Pat. No. 4,975,808 discloses a liquid crystal display apparatus which aims to provide a more uniform distribution of light across a low-profile LCD. In this case the back face of the light pipe is selectively painted white. A pattern in the form of a border, half-sun and ovals around each lamp is left unpainted. The smooth unpainted surfaces of the light pipe internally reflect light that has an angle of incidence less than the critical angle. The white paint provides diffuse reflection, scattering the light. Some of this light escapes the light pipe and enters the LCD. The unpainted portion has the effect of dimming the so-called hot spots caused by the proximity of the light-sources, and increasing the brightness in the painted area. While this arrangement goes some way to improving uniformity of illumination, it still leaves room for improvement. Moreover, the use of painted and unpainted reflected areas provides only limited scope for varying the relative intensity in the dimmer areas insofar as the intensity is enhanced equally in all painted areas and there is little or no control over the degree of intensity enhancement in the painted areas.

SUMMARY OF THE INVENTION

According to the present invention there is provided an illuminated liquid crystal display apparatus, comprising a liquid crystal display, at least one light source, a light guide comprising a transparent plate-like member having front, back and side faces disposed behind the liquid crystal display for distributing light from the light source over an area of the liquid crystal display, and light-attenuating means disposed adjacent the light guide and including discrete areas substantially filled with a pattern of dots for reducing the intensity of light reaching portions of the liquid crystal display nearest to the light source.

A back-lit liquid crystal display (LCD) apparatus in accordance with the invention has the advantage that it is very simple and inexpensive to implement, it gives remarkably uniform back illumination, and it offers the potential of varying the level of attenuation at would-be hot spots by altering the density and/or distribution of the dot pattern.

It is noted here that in the present context the term "dot" is not restricted to a small circular area and the expression "pattern of dots" is intended to include any discontinuous pattern of recurring features such as dashes, ovals, stars, squares or other shapes.

The light-attenuating means may be a thin sheet provided against either the front or back face of the light guide. In the former case the sheet is translucent, and the dots are non-translucent (absorbing or reflective). In the latter case the sheet is reflective and the dots are non-reflective. Alternatively a reflective layer may be coated directly on the back face of the light guide and the spots are formed by selective removal or omission of the coating. On the other hand a pattern of light-blocking dots may be formed directly on the front face of the light guide.

In each of the four examples mentioned in the preceding paragraph the apparatus can be made very slim indeed. It will be clear that where the attenuating means is coated directly on the front or back face of the light guide that the additional space in the thickness direction is negligible. However, even when the attenuating member is formed as a sheet, the thickness of the sheet can be very small. For example the sheet may be a sheet of paper on which the pattern of dots is printed with conventional black ink.

In one example the pattern of dots is substantially uniform, i.e. all the dots have the same shape, size, and pitch. In another example the pattern of dots is graduated, i.e. the ratio of the black to white, or reflective area to non-reflective area, varies gradually so that the intensity of light reaching the LCD is reduced less as the distance from the light source increases.

BRIEF DESCRIPTION OF THE DRAWINGS

Embodiments of the invention will now be described, by way of example, with reference to the accompanying drawings, in which:

FIG. 1 is a schematic cross-section of a liquid crystal display apparatus in accordance with the present invention;

FIG. 2 is a plan view of the liquid crystal display apparatus in FIG. 1;

FIG. 3 is a plan view of an attenuating member for use in the liquid crystal display apparatus in FIGS. 1 and 2;

FIG. 4 is a schematic cross-section of a different liquid crystal display apparatus in accordance with the invention;

DETAILED DESCRIPTION OF THE INVENTION

Figure 5:
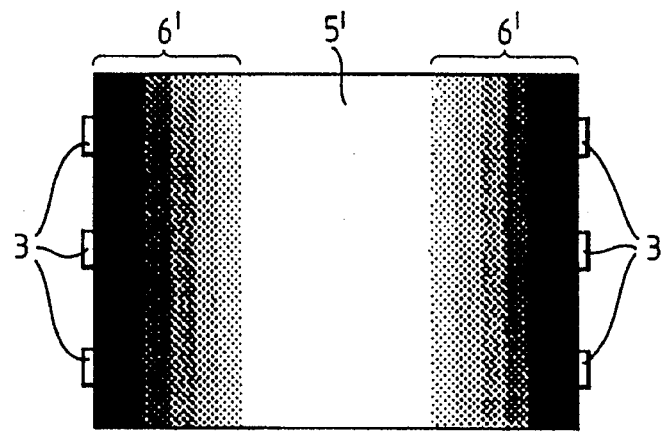
FIG. 5 is a plan view of a different attenuating member.

The apparatus shown in FIG. 1 comprises a conventional liquid crystal display (LCD) 1 behind which is mounted in contiguous relationship a flat plate-like light guide 2 made, for example of acrylic.

The front face of the light guide 2, i.e. the face adjacent the LCD 1, may be roughened in known manner to promote the escape of light into the LCD. A number of light emitting diodes (LED's) 3 are provided along opposing side faces of the light guide for injecting light into the light guide. As can be seen in FIG. 2, a row of three LEDs is used on each of the two opposite side faces. The two sets of three LEDs are present in a respective recess 4 at the sides of the light guide 2.

Beneath the light guide 2, and in contiguous relationship therewith, there is provided a light attenuating member 5, in this case a thin sheet of reflective material, e.g. white paper, on which is printed in black ink a pattern of dots 6 as shown in FIG. 3. The pattern of dots includes two half-elipse shapes 6 extending respectively from the edge of the attenuation sheet 5 adjacent the rows of LEDs 3.

The half-ellipse shapes 6 are each filled with a regular array of equally sized and equally spaced dots printed with a conventional black printing ink. The pattern of dots may, for example, be printed using a laser printer or a bubble jet printer. These two dot patterns reduce the overall level of reflection at the back face of the light guide at the two half-elliptical areas. This has the effect of attenuating the amount of light which escapes from the light guide 5 into the LCD 1 at the corresponding areas. Hence a more uniform illumination can be achieved over the whole area of the LCD 1.

In practice the Applicant has found that the pattern of dots described here provides remarkable results in a low-profile LCD apparatus. Moreover, it transpires that the dot pattern is not critical. Thus if the pattern varies slightly, either across the width of the half-elliptical areas, or from product to product; or if the dot pattern is imperfect, e.g. some of the dots may be inadvertently omitted or poorly defined; it would appear that these defects have virtually no appreciable effect on the performance of the attenuator and excellent uniformity of illumination is still achieved. On the other hand if it is desired to vary the degree of attenuation it will be evident that this can be done by varying the size and/or frequency of the dots, i.e. altering the proportion of black to white areas.

The whole LCD apparatus may be supported on a substrate such as a printed circuit board 7 in conventional manner.

In FIG. 4 there is shown a modification of the LCD apparatus described above. In FIG. 4 the same reference numerals are used to denote the corresponding parts as in the previous embodiment described with reference to FIGS. 1 to 3. In this case the attenuating sheet 5 is provided between the LCD 1 and the light guide 2. The sheet 5 may be transparent (or translucent) and have a pattern of dots printed thereon as before. The dots themselves may either be reflective or absorbing, in either case they will help to prevent light escaping into the LCD at the patterned areas. The patterned areas on the attenuating member may be the same as those described in the previous embodiment with reference to FIG. 3.

It is noted here that the attenuating member need not be provided as a separate sheet but may be coated directly on the relevant surface of the light guide. Suitably the attenuating coating would be provided selectively on the light guide surface. Thus in the first embodiment the reflective coating would be provided on the back face of the light guide 2, and the pattern of dots would be provided by omitting or removing the coating to form the dots. In the configuration shown in the second embodiment however the coating would be selectively provided (or retained) only at the areas corresponding to the dot patterns.

The dot patterns provided on the attenuating means may have a graduated, rather than a uniform distribution, so as to attenuate the light less severely at greater distances from the light source. Thus for example there is shown in FIG. 5 an alternative dot pattern which may be used for the attenuator 5 in a LCD apparatus which is side lit as in the previous embodiments. Here dot patterns 6' comprise a number of parallel bars extending transversely to the longitudial axis of the display. These bars provide progressively less attenuation the further they are away from the side edge of the attenuator 5'. This is achieved either by reducing the size or frequency of the dots from bar to bar.

Figure 6:
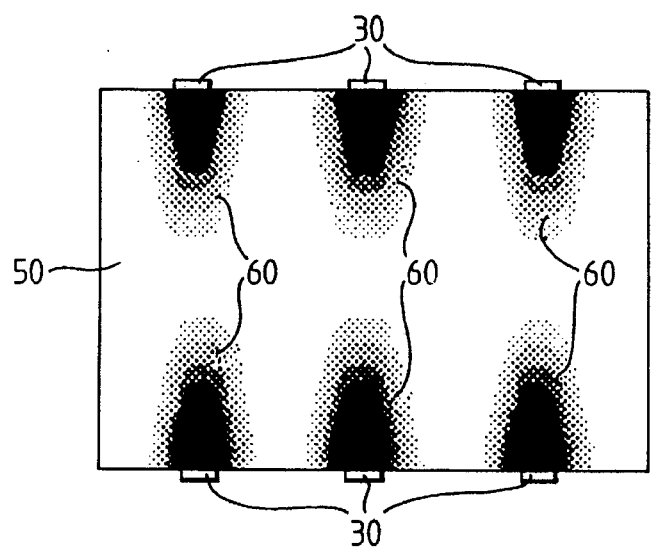
FIG. 6 is a plan view of a further attenuating member.

In FIG. 6 there is shown an attenuating member 50 for use where the illumination is provided by three LEDs 30 along one long side of the display and three further LEDs 30 along the opposite long side of the display. Each LED 30 has a respective half-elliptical pattern 60 of dots on the attenuator 50 extending from the edge adjacent the respective LED 30 towards the longitudial axis of the attenuator. As can be seen from FIG. 6 these dot patterns 60 provide gradually less attenuation as the distance from the LED 30 increases. This is achieved either by reducing the size or frequency of the dots.

Figure 7:
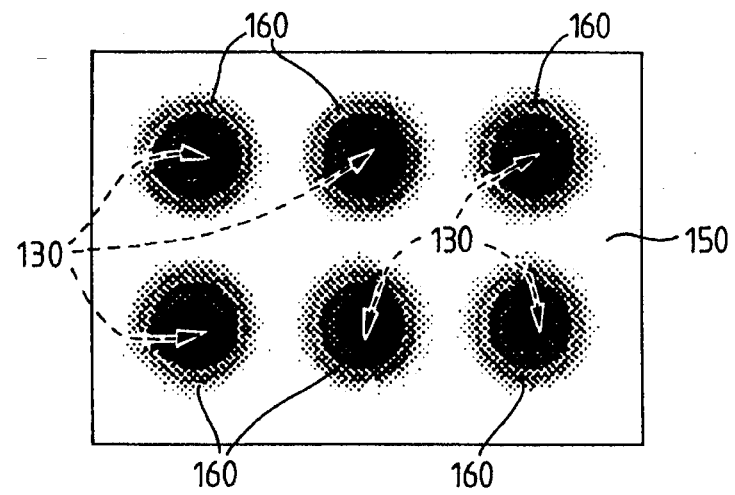
FIG. 7 is a plan view of another attenuating member.

In FIG. 7 there is a shown an attenuator 150 for use in an LCD apparatus where the LEDs are provided behind (rather than at the edge of) the light guide. In this case, six LEDs 130 are provided behind the LCD, and six circular dot patterns 160 are provided on the attenuator 150, the central point of each circular dot pattern being registered with a respective LED 130. In this case each pattern of dots 160 is graduated radially around the area of the LEDs 130, again to provide less attenuation as the distance from the LED 130 increases, and so provide uniform illumination over the whole LCD area.

It will be evident in view of the foregoing description that various modifications may be made within the scope of the present invention. In particular different patterns of dots may be used on the attenuator in different circumstances. The overall shape of the dot pattern may be varied to suit particular needs, as too may the size and frequency of the dots making up the pattern. In the case of the graduated dot pattern, the graduation may be continuous rather than stepwise, in which case the distinct bands visible in FIGS. 5–7 would not be discernible. Finally, it is noted that light sources other than LEDs may be used for illuminating the LCD apparatus.

What we claim is:

1. An illuminated liquid crystal display apparatus, comprising:

a liquid crystal display, a plurality of point light sources generally located behind the liquid crystal display, a light guide comprising a transparent plate-like member having side faces disposed behind the liquid crystal display for distributing light from the light sources over an area of the liquid crystal display, and light-attenuating means disposed adjacent the light guide and including a pattern of dots defining a distinct individual portion proximate each one of the point light sources and spaced from one another for reducing the intensity of light reaching portions of the liquid crystal display nearest to the individual point light sources.

2. An illuminated liquid crystal display apparatus as claimed in claim 1, wherein the light-attenuating means comprises a reflective sheet and the dots provided thereon are non-reflective.

3. An illuminated liquid crystal display apparatus as claimed in claim 1, wherein the light-attenuating means comprises a reflective layer coated on the light guide, and the dots provided therein are non-reflective.

4. An illuminated liquid crystal display apparatus as claimed in claim 1, wherein the light attenuating means comprises a translucent sheet and the dots provided thereon are non-translucent.

5. An illuminated liquid crystal display apparatus as claimed in claim 1 wherein the light attenuating means comprises a pattern of light-blocking dots.

6. An illuminated liquid crystal display apparatus as claimed in claim 1, wherein the pattern of dots is graduated whereby the intensity of light reaching the liquid crystal display is reduced less as the distance from the light source increases.

7. An illuminated crystal display apparatus as claimed in claim 6, wherein the plurality of light sources are disposed adjacent at least one of the side faces of the light guide, and the pattern of dots is graduated linearly.

8. An illuminated guide crystal display apparatus as claimed in claim 6, wherein the point light sources are provided behind the light guide, and the pattern of dots is graduated radially around the areas of the individual light sources.

* * * * *